United States Patent
Maier et al.

(10) Patent No.: US 9,801,352 B2
(45) Date of Patent: Oct. 31, 2017

(54) CLEANING SYSTEM FOR MILKING CUPS

(71) Applicants: Jakob Maier, Tuerkheim (DE); Wilfried Hatzack, Tuerkheim (DE)

(72) Inventors: Jakob Maier, Tuerkheim (DE); Wilfried Hatzack, Tuerkheim (DE)

(*) Notice: Subject to any disclaimer, the term of this patent is extended or adjusted under 35 U.S.C. 154(b) by 88 days.

(21) Appl. No.: 14/822,344

(22) Filed: Aug. 10, 2015

(65) Prior Publication Data
US 2015/0342142 A1 Dec. 3, 2015

Related U.S. Application Data (62) Division of application No. 12/312,531, filed as application No. PCT/EP2007/009842 on Nov. 14, 2007, now Pat. No. 9,380,758.

(30) Foreign Application Priority Data

Nov. 14, 2006 (DE) .................. 10 2006 053 602

(51) Int. Cl.
  *A01J 7/02* (2006.01)
  *B08B 3/04* (2006.01)

(52) U.S. Cl.
  CPC .............. *A01J 7/025* (2013.01); *A01J 7/02* (2013.01); *B08B 3/04* (2013.01)

(58) Field of Classification Search
  CPC .............. A01J 7/02; A01J 7/025; B08B 3/04
  USPC .......... 119/14.18, 14.47, 14.53, 14.54, 14.55
  See application file for complete search history.

(56) References Cited

U.S. PATENT DOCUMENTS

| | | | |
|---|---|---|---|
| 1,946,400 A | 2/1934 | Hapgood | |
| 2,595,539 A | 5/1952 | Redman, Jr. | |
| 3,629,005 A | 12/1971 | Belden | |
| 3,688,783 A | 9/1972 | Owens | |
| 3,834,407 A | 9/1974 | Heitman | |
| 4,175,514 A | 11/1979 | Souza et al. | |
| 4,572,105 A * | 2/1986 | Chowdhury | A01J 7/022 119/14.18 |
| 4,580,527 A | 4/1986 | Bucker | |
| 4,726,322 A | 2/1988 | Torsius | |
| 4,854,336 A | 8/1989 | Byzitter | |
| 4,924,809 A | 5/1990 | Verbrugge | |
| 5,134,967 A | 8/1992 | Marshall | |
| 5,161,482 A | 11/1992 | Griffin | |
| 5,678,506 A | 10/1997 | vanderBerg et al. | |
| 6,267,077 B1 | 7/2001 | van den Berg et al. | |
| 6,308,655 B1 | 10/2001 | Oosterling | |
| 6,561,126 B2 | 5/2003 | Forsen et al. | |
| 7,263,948 B2 | 9/2007 | Ericsson et al. | |
| 9,380,758 B2 * | 7/2016 | Maier | A01J 7/025 |

(Continued)

FOREIGN PATENT DOCUMENTS

| | | |
|---|---|---|
| DE | 44 32 754 A1 | 3/1996 |
| EP | 1 084 608 A2 | 3/2001 |
| EP | 1 579 758 A1 | 9/2005 |

(Continued)

*Primary Examiner* — David Parsley
(74) *Attorney, Agent, or Firm* — Flynn, Thiel, Boutell & Tanis, P.C.

(57) ABSTRACT

A cleaning system for milking cups containing a dispensing device into which at least two different cleaning fluids can be introduced inside the milking cup in such a way as to enable an efficient intermediate disinfection between individual milking processes.

16 Claims, 7 Drawing Sheets

(56) References Cited

U.S. PATENT DOCUMENTS

2007/0277737 A1   12/2007   Maier et al.

FOREIGN PATENT DOCUMENTS

| WO | WO 03/077645 A1 | 9/2003 |
| WO | WO 2005/094566 | 10/2005 |
| WO | WO 2005/102035 | * 11/2005 |
| WO | WO 2006/073368 A1 | 7/2006 |

* cited by examiner

CLEANING SYSTEM FOR MILKING CUPS

CROSS-REFERENCE TO RELATED APPLICATIONS

This is a divisional of prior U.S. application Ser. No. 12/312 531, filed on Nov. 12, 2010, which was the National Stage of International Application No. PCT/EP2007/009842, filed Nov. 14, 2007.

BACKGROUND OF THE INVENTION

The present invention relates to the milking of dairy cattle using dairy utensils with several milking cups, wherein the milking cups are in particular cleaned or disinfected between the individual milking processes.

With the increase in globalization of agricultural markets, ever greater demands are placed on producers of milk and milk products. On the one hand, the milk has to be produced as inexpensively as possible, on the other hand, however, the high quality of the milk must be maintained. To permit the production of large quantities of milk in an agricultural business, all-automatic or semiautomatic milking plants are employed, such that a plurality of animals can be milked at moderately low personnel costs. While all-automatic milking plants, so-called milking robots, offer the possibility of severely reducing the number of personnel required for the production of milk, as in principle the complete milking operation can be run automatically, the extremely high purchase costs as well as the efforts as regards the maintenance of the all-automatic system are important viewpoints that make the introduction of all-automatic plants, in particular in small and medium-sized agricultural businesses, appear disadvantageous. Therefore, semiautomatic milking plants are operated in many businesses where certain operations during the milking process are performed manually, where in particular the placing of the milking cups at the teats of the animals is carried out manually.

The milking process itself is normally performed such that a milk flow from the teat into the milking cup is initiated by generating a certain vacuum in a milking cup; and the obtained milk is then discharged from the milking cup into a corresponding collecting line. Since the introduction of automatic and semiautomatic milking plants in agricultural businesses, many efforts have been made to ensure an operation of milking plants as efficient as possible as it is extremely important for a permanently high yield to carry out a milking operation by means of the automatic milking plant that resembles the natural sucking of the calf at the udder of the dam. That means, in the automated or semiautomated milking process, on the one hand a low degree of intervention by an operator should be necessary to thus keep the proportion of personnel expenses in an agricultural business as low as possible, on the other hand, however, a high degree of "naturalness" of the automated milking process is to be ensured. It shows that a permanently high yield of dairy cattle can normally only be ensured if a high yield of milking is achieved over the whole year as then the milk-producing cells, i.e. the alveoles, are enduringly stimulated to continuously produce milk. For this, it is normally necessary to observe certain physiological aspects, for example sufficient stimulation, appropriate pressure ratios at the teat as well as a certain degree of hygiene. Thus, already the milking process itself can determine the quantity and quality of the milk. That means, with an optimal adaptation of the mechanical milking process to the physiological conditions of the dairy cattle, permanent health of the udder can be achieved which in turn is a precondition for achieving a high yield of high-quality milk in the long run. For example, a sufficiently high degree of milking yield is an essential aspect not only for the total quantity of milk produced, but also for the quality of the milk, as in particular the germination index of the milk can be clearly reduced in the long run by an efficient milking process.

Apart from the many physiological aspects to be considered in the mechanical milking process, there are, however, also hygienic requirements decisive for the quality of the milk. For example, even in small- and medium-sized agricultural businesses, a plurality of dairy cattle is milked using the same dairy utensils. In this case, it is of particular importance to restrict or prevent the transmission of germs from one animal to another one, if possible, so that a high degree of animal health is ensured even with large live stock. For example, the legislative body in the various countries provides corresponding regulations anchored in so-called milk rules which are to ensure a corresponding standard of hygiene. The observation of these standards of hygiene, however, is not only important with respect to the compliance with the legal requirements, but in the long run also results in better animal health and thus in a higher milk yield. Therefore, a plurality of systems and methods are employed in order to clean and disinfect the milking cups between the individual milking processes, where, however, the efficiency of these devices and methods is partly very restricted in practical conditions. For example, for certain cleaning liquids, such as peracetic acid, a certain minimum application time is required, so that the desired disinfecting effect is achieved. On the other hand, a cleaning process that lasts too long can result in a clear loss of the total efficiency of the milking plant. Moreover, the contact of the cleaning liquids with the produced milk should be avoided if possible to prevent the introduction of foreign substances into the milk. In particular in semiautomatic milking plants, the efficiency and quality of the corresponding cleaning and disinfection process in particular depends on the corresponding operator of the milking plant as in such plants, for example, the quality and composition of the disinfectant and the cleaning liquids, the application time and the like can be influenced by the corresponding operator. Under such conditions, it is often difficult to maintain the conditions favorable for the milking process and the quality of the milk, or the specified legal requirements are not completely met. For example, on the European market, a cleaning procedure after individual milking processes is prescribed in which, after the removal of the milking cups, first a rinsing process with water, then an application of peracetic acid and then again a rinsing process with water must be performed. Moreover, a certain minimum application time of the peracetic acid must be observed to thus achieve the desired disinfecting effect. To realize these legal requirements, for example various cleaning systems are employed, some of which, however, have a low efficacy. For example, in large agricultural businesses, so-called passage baths are employed in which the milking cups are pulled through corresponding liquid baths after the milking process, so that milking cups are first pulled through a water bath, followed by a peracetic acid bath, and normally a water bath follows subsequently. However, in such an arrangement, the cleaning liquids themselves can be heavily contaminated, as in particular after several cleaning processes, corresponding impurities that can attach to the outer surfaces of the milking cups are introduced into the corresponding cleaning baths. The contamination of the cleaning liquids continuously increasing thereby thus can lead to a severely reduced disinfection effect or can even result in increased germ contamination. On the other hand, a frequent replacement of the cleaning liquids requires a high additional amount of work as well as a high quantity of disinfectants. In other semiautomatic milking plants, the corresponding cleaning process is performed manually, so that efficiency and duration of the corresponding cleaning process can depend on the corresponding person, the current conditions and the like. Thus, a permanently high quality and reliability of the corresponding cleaning process is possibly not ensured, in particular if there is a high work load as well as a varying degree of education of the corresponding qualified personnel.

Therefore, there is a demand, in the automated or semiautomated milking process, to improve the cleaning and disinfection, respectively, of milking cups, such that high efficiency and constant quality of the cleaning process are achieved.

SUMMARY OF THE INVENTION

According to one aspect of the present invention, this object is achieved by a cleaning system for milking cups. The cleaning system according to the invention comprises a mounting for receiving at least a portion of a milking cup containing an opening for introducing a teat. Furthermore, a fluid dispensing device is provided in the cleaning system which is designed to introduce a first cleaning fluid from a first fluid source and a second cleaning fluid from a second fluid source of the milking cup into the opening.

The cleaning system embodied according to the invention thus permits to introduce at least two different cleaning fluids through a dispensing device into the milking cups, so that this provides the possibility of performing an efficient cleaning and disinfection sequence. The supply of two cleaning fluids by means of one single fluid dispensing device thus permits a high degree of efficiency and reproducibility of the supply of a corresponding cleaning fluid, for example water, peracetic acid and the like, as each milking cup can be arranged at a certain cleaning position at which then the cleaning fluids can be supplied corresponding to a desired sequence and with a desired quantity and application time. Thus, by the provision of a fluid dispensing device that can introduce different cleaning fluids into the milking cups, a high degree of flexibility for establishing a suited cleaning and disinfection sequence is achieved, where the required operations for the handling of the milking cups and the space required for the application of cleaning fluids are kept low.

In a further advantageous embodiment, a supply line connected to the fluid dispensing device with a first feed line in communication with the first fluid source via a first valve means, and a second feed line in communication with the second fluid source via a second valve means, is provided.

This embodiment of the cleaning system ensures an individual control of the quantity of the individual cleaning liquids and/or gases, where by the corresponding feed lines and valve means, a desired controllable decoupling from the dispensing device is possible. Thereby, however, a corresponding reverse effect of the fluid dispensing device on the corresponding fluid sources is clearly reduced, so that there the integrity of the cleaning fluids with respect to a possible contamination is ensured, while it is simultaneously permitted to provide a required minimum amount of cleaning fluid per sequence without the cleaning process being influenced by varying compositions of the cleaning solution or a varying quantity of liquid. In this manner, constant operational conditions for the cleaning sequence can be maintained at any time.

In a further advantageous embodiment, the fluid dispensing device comprises an outlet that can be fed by the first and second fluid sources. With this structure, the volume requirement of the fluid dispensing device as well as the complexity thereof can be kept very low as one single outlet, for example in the form of an injection nozzle etc., can be used for several types of cleaning fluids. Simultaneously, there is the possibility of using one of the cleaning fluids, for example in the form of water, for cleaning the outlet, to thereby efficiently remove residues of the disinfectant, for example peracetic acid, from the region of the outlet, if required, if, for example, the cleaning system itself must be cleaned.

In a further illustrative embodiment, the fluid dispensing device comprises a first outlet that can be fed by the first fluid source, and a second outlet that can be fed by the second fluid source. In this manner, a high degree of flexibility in designing the cleaning sequence is ensured, as both cleaning fluids can be independently introduced into the milking cups in any arbitrary sequence, duration and quantity. Here, the outlets can be arranged in a suited manner such that an efficient wetting of the interior of the milking cup can be achieved for both cleaning fluids. In some illustrative embodiments, several corresponding outlets are provided, where one set of outlets is fed by the first fluid source, while another set of outlets is fed by the second fluid source. Here, the arrangement as well as the dimensioning of the corresponding outlets can be appropriately adjusted to thus achieve a desired type of wetting and a penetration depth into the milking cup.

In a further advantageous embodiment, the cleaning system further comprises a control means designed to control the supply of the first and the second cleaning fluids to the fluid dispensing device. By providing the control means, the efficiency and degree of automation of the corresponding cleaning and disinfection sequence can be handled very flexibly. For example, corresponding predetermined chronological sequences can be implemented in the control means to thus precisely and reproducibly perform a corresponding cleaning process after each milking process. In this manner, the high degree of variability, as it occurs due to operator-assisted cleaning sequences, can be clearly reduced, where simultaneously the corresponding conditions in the individual cleaning process or over lengthy operating phases can be adapted to the current conditions, if required. If for example a higher contamination of the milking cups is expected or detected, one can react by calling in a suited sequence, followed by a corresponding reaction on the basis of reproducible control sequences.

In one advantageous embodiment, the control means is designed to initiate the supply of the first and the second cleaning fluids in chronological sequence. As already illustrated, a sequence for supplying several cleaning fluids determined by legal provisions is often required, so that a corresponding time schedule can be set up in the control means. In particular due to the successive discharge of the various cleaning fluids, on the one hand efficient disinfection can be achieved, while at the same time the corresponding quantities of the cleaning fluids can be provided in a precise and reproducible way. Thus, for example by the successive supply of the first and the second cleaning fluids, not only the quantity can be apportioned in a suited manner, but the respective application time can also be appropriately controlled, such that, for example, one cleaning sequence can be set in the control means which reliably and reproducibly ensures the supply of water, the subsequent supply of a disinfectant, for example peracetic acid, with a correspondingly set application time, followed by a supply of water, where altogether a low quantity of cleaning fluid is sufficient and the space requirement for the corresponding cleaning sequence remains low.

In a further advantageous embodiment, the mounting for receiving a portion of the milking cup is provided in a chamber which is designed to accommodate or maintain, respectively, a predetermined fluid level at least during a predetermined operating phase. By the provision of the corresponding chamber, the efficiency of the cleaning fluids as well as their consumption can be further improved, as at least in some operating phases of the cleaning process, a suited liquid level can be set and also maintained, so that correspondingly wetted areas can very intensively interact with the cleaning fluid. In this manner, the corresponding cleaning fluid can act on the milking cup with high efficiency, where in some embodiments corresponding means are provided to lower the fluid level or completely remove the corresponding fluid if required, while the required quantities of cleaning fluids nevertheless remain low compared to many conventional methods, and a corresponding contamination of the cleaning fluids between the individual cleaning sequences is also kept low.

Preferably, a level limiting means is provided which is suited to limit the fluid level in the chamber to a predetermined maximum level. In this manner, the process conditions can be adjusted in a flexible and reproducible manner, without requiring an increased complexity of the milking plant. For example, during certain phases of the cleaning sequence, a defined quantity of rinsing liquid, for example water, can be desirable, while the limiting means nevertheless ensures that at most a maximum desired quantity is present in the corresponding chamber. Advantageously, the level limiting means can be designed such that the maximum level in the respective operating phase can be adjusted, so that, depending on the operating mode, the corresponding degree of wetting and the liquid quantity to be used are given by the current maximum level. If for example a higher degree of contamination is present, the level during rinsing and disinfecting can be generally increased and then, during the normal operating mode, lowered again, so that the consumption of cleaning fluid can be reduced again.

In a further advantageous embodiment, a fluid dehumidification means is provided which is designed to actively reduce the proportion of the first and/or the second fluid in the milking cup. Typically, it is advantageous to efficiently remove the corresponding cleaning fluid from the milking cup after the introduction of the cleaning fluid and after a desired application time, to thus reduce an interaction of the individual cleaning fluids as well as a possible effect on the milk. By the fluid dehumidification means according to the invention, the operation of removing cleaning fluids can be actively supported, for example by employing suited mechanisms, such as a flow of gas, mechanical movement and the like, to reduce the proportion of residual fluid in the milking cup.

In an advantageous embodiment, the fluid dehumidification means comprises an actuator means designed to move the milking cup upon application of the first or second cleaning fluid. By this mechanical movement, the wetting with the previously introduced cleaning fluid can be thus reduced in a very efficient manner, so that the next process step in the operation can be performed with a low influence by the previously introduced fluid. For example, the corresponding actuator means can be designed to release the milking cup from the mounting and to move it with an oscillating-like movement, so that the dripping off of the cleaning fluid is clearly supported.

In other embodiments, the dehumidification means can apply air or gas, for example nitrogen, to the milking cup, so that the proportion of fluid in the milking cup is reduced before the next step. Thus, by an active reduction of the fluid proportion, the period of the complete operation can be clearly reduced without affecting the efficiency.

In a further advantageous embodiment, the cleaning system further comprises a spray means designed to wet at least a region of the outer surface of one or several milking cups with a cleaning agent. With a corresponding additional spray means, which can be operated for example with water or another suited cleaning agent, it can thereby also be accomplished to reduce soiling at the outer surface of the milking cups without the occurrence of a severe contamination of the first and the second cleaning fluids introduced into the interior of the milking cup by the dispensing device. In this manner, it is possible to perform a very efficient complete cleaning and disinfection of the milking cups in the intermediate phases of the milking process, where the outside cleaning, the inside cleaning and the disinfection take place in a very small volume under clearly defined conditions.

In a further advantageous embodiment, a position sensor means is provided which supplies a signal when the milking cup is positioned in the mounting. In this manner, an efficient control of the positioning operation itself, if the same is performed automatically, as well as of the further cleaning sequence can be achieved. For example, the signal of the sensor means can indicate the current position of the milking cup, for example the signal can indicate whether the milking cup has reached a desired operating position in the cleaning system.

In a further advantageous embodiment, the position sensor means is connected to the control means, the control means controlling the supply of the first and/or the second cleaning fluid in response to the signal. Thus, by the corresponding signal, for example the supply of the first cleaning fluid can be initiated at the suited point in time, so that the wetting of the interior of the milking cup is achieved in a reliable and reproducible manner, without a portion of the fluid unnecessarily draining or being distributed in the cleaning system without any relevant effect.

In a further advantageous embodiment, a vacuum control means is provided which is designed to control an operating vacuum in the milking cup. The vacuum control means permits to coordinate the cleaning sequence with the operating state of the milking cup in a suited manner. For example, it is typically necessary to interrupt the operating vacuum built up in the milking cup during milking to thereby remove the milking cup from the teats after the milking process is terminated. Permanent deactivation of the milking vacuum in the region of the milking cup, however, can lead to residual milk flowing out and then being distributed in an uncontrolled manner. However, thanks to the vacuum control means, the operating vacuum can be selectively restored to thus prevent uncontrolled flowing out of residual milk as long as the milking cup is not yet appropriately positioned in the mounting. The vacuum control means is in particular advantageous in cooperation with corresponding holding means for milking cups, in which these are manually or automatically removed from the teats and held in a suited manner without bending of the corresponding milk hoses causing a deactivation of the milking vacuum in the region of the milking cups. In this case, the vacuum control means can adjust suited pressure conditions after the removal of the milking cups or after the milking cups have automatically falling off, so that flowing out of residual milk is essentially restricted to the region of the mounting, so that the residual milk can be removed in a defined manner, for example by means of water. Advantageously, the vacuum control means is designed to control the operating pressure in the milking cup in response to the signal of the position sensor means. In this manner, it can be reliably ensured that at least the major portion of the residual milk flows out in the mounting, no matter how long the positioning of the individual milking cups in the mounting lasts.

In a further advantageous embodiment, the cleaning system further comprises a transport means designed to automatically position the milking cups in the mounting. In this manner, even in semiautomatic milking plants, where a certain degree of manual operation is required, it will be accomplished to observe very exactly defined operational conditions during the cleaning sequences between the individual milking processes. In other embodiments, the cleaning system is designed such that even in case of a manual supply of the milking cups, a corresponding suited positioning of the individual milking cups is ensured. For this, an essentially funnel-like opening can be provided such that during contact of the milking cups with the corresponding funnel-like openings, a suited centering of the milking cups and thus a positioning in the mounting are effected. Thus, even with a merely manual supply of the milking cups to the cleaning system, a high degree of stability in view of the operational conditions and the cleaning sequence can be achieved due to the exact arrangement at the cleaning position.

According to a further aspect of the present invention, a milking plant is provided, which provides dairy utensils with several milking cups and a vacuum means for providing a vacuum in the dairy utensils for sucking off milk. Furthermore, a milk collecting means is provided and connected to the dairy utensils and the vacuum means. Furthermore, a cleaning system is provided to clean milking cups, the cleaning system permitting the supply of a first and a second cleaning fluid by means of a fluid dispensing device.

Thereby, the milking plant according to the invention also offers the advantage of achieving a high degree of reliability and stability of the operational conditions by the provision of two cleaning fluids by means of one single dispensing device, as was already described above. In a further advantageous embodiment, a holding means for the milking cups is furthermore provided and designed to position the milking cups for manually placing the milking cups for the milking process. To this end, the holding means can be designed such that the individual milking cups are essentially arranged horizontally, so that milking cups are to be manually placed individually at a teat of the animal. This holding means also positions the milking cups, after the end of the milking process, in a suited manner, such that they can be very efficiently transferred to the corresponding cleaning system and positioned there in the corresponding mounting. For example, a previously described transport means can be provided and connected to the holding means to thereby position the holding means after a milking process relative to the cleaning system, such that the milking cups are automatically placed in the mounting of the cleaning system. In this manner, a high degree of automation can be achieved even in semiautomatic milking plants, where then the complete process after the removal of the milking cups is essentially automated and thus standardized, so that constant conditions and thus a constantly high efficiency of the cleaning and disinfecting process are achieved.

Advantageously, here the vacuum control means, as it is described, for example, above, is designed such that the operating vacuum remains active during the positioning of the milking cups until these are positioned in the mounting of the cleaning system. In this manner, a flowing out of the residual milk can be clearly reduced, so that the individual components of the milking plant are only very slightly wetted by residual milk, so that the risk of germ formation in the milking plant is clearly reduced.

According to a further aspect of the present invention, a method for cleaning milking cups is provided, wherein the method comprises, after a first milking process, the successive wetting of a portion of the interior of the milking cups with at least two different cleaning fluids in a cleaning region that is the same for each of the two different cleaning fluids, and the use of the cleaned milking cups for a second milking process.

As already illustrated above, by the provision of two different cleaning fluids at the same place of cleaning, a clear improvement with respect to the efficiency and throughput can be achieved, as on the one hand a small volume of the cleaning system and thus short paths in the handling of the milking cups are sufficient, as the means necessary for the intermediate disinfection can be provided at one position, while on the other hand there is also the possibility of creating very constant operational conditions. This is in particular advantageous in connection with milking techniques where the milking cups are manually placed during the milking process, so that in such systems on the one hand the disadvantages of extreme automation and the investment and maintenance costs involved can be reduced, while one nevertheless obtains a high degree of automation, in particular with respect to an efficient intermediate disinfection of the milking cups. It is thus, for example, possible to supply, in a very efficient manner and only requiring little space, a first quantity of a first cleaning fluid, a second quantity of the second cleaning fluid, and subsequently a third quantity of the first cleaning fluid, to thereby achieve very efficient disinfection of the milking cups, where this can be in particular performed in accord with the respective current provisions. It is furthermore possible to ensure very efficient disinfection, where the quantity of the disinfectants to be employed per cleaning process is relatively low. For example, about 0.1 to 0.5 liters of a cleaning fluid, for example peracetic acid, are sufficient to treat four milking cups of a common milking plant according to the requirements of the milk rules. A corresponding cleaning sequence can be performed within 30 to 60 seconds, so that the proportion of intermediate disinfection in the complete milking process remains low.

Further advantageous embodiments, objects and advantages of the present invention can be taken from the further detailed description as well as from the enclosed patent claims.

BRIEF DESCRIPTION OF THE DRAWINGS

Further illustrative embodiments will now be described in greater detail with reference to the accompanying drawings, wherein FIG. 1a schematically shows a cleaning system with a mounting for receiving milking cups and a dispensing device for applying various cleaning fluids to the interior of the milking cups according to an illustrative embodiment.

DETAILED DESCRIPTION OF THE INVENTION

Figure 1A:
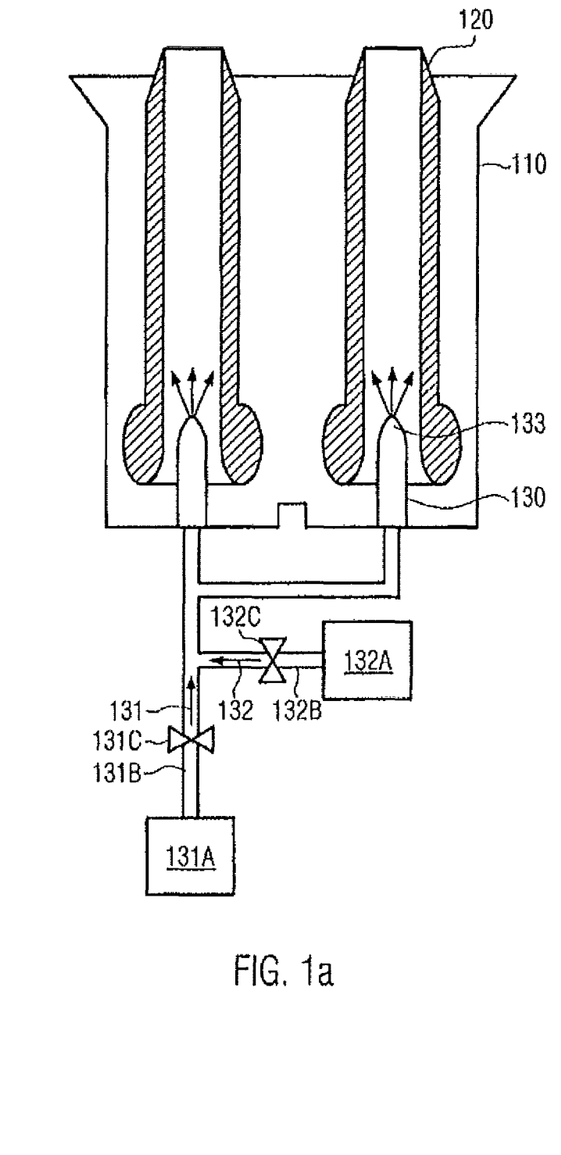

FIG. 1a schematically shows a cleaning system 100 in which a mounting 110 is provided and designed to receive one or several milking cups 120 and hold it/them in position during a cleaning sequence on the basis of at least two different cleaning fluids. The mounting 110 is, in one illustrative embodiment, provided in the form of a chamber in which, if required, a certain liquid level, for example in the form of water, can be maintained. The mounting 110 is further advantageously designed such that the milking cups 120 can be received essentially with their complete volumes, i.e. across their total length, so that, if required, efficient rinsing and wetting essentially of the complete outer area of the milking cups 120 can be performed, if this is necessary. For example, during certain operating phases, for example during a final cleaning after the termination of a plurality of individual milking processes, it can be advantageous to remove corresponding soiling at the complete outer area of the milking cups 120. In other embodiments, the mounting 110 can be designed such that at least the interior of the milking cups 120 is accessible for suited cleaning and disinfection, without essentially enclosing the complete outer area of the milking cups 120 by the mounting 110.

Furthermore, in the cleaning system 100, one or several fluid dispensing devices 130 are provided which are designed and arranged such that at least a first cleaning fluid 131 and a second cleaning fluid 132, which are obtained from corresponding fluid sources 131a, 132a, can be dispensed. That means, the one or the several dispensing devices 130 can introduce at least the two cleaning fluids 131, 132 into the milking cups 120, at least in a lower area thereof. In this manner, different cleaning fluids can be applied to the milking cup 120 at one single given cleaning position, while only little space is required. For this, in the represented embodiment, each of the dispensing devices 130 is provided with a corresponding outlet 133 which can be connected to the fluid source 132a via a corresponding feed line 132b and an associated valve 132c. Similarly, the outlet 133 can be connected to the fluid source 131a via a corresponding feed line 131b and a corresponding valve means 131c, where a corresponding introduction of the cleaning fluids 132, 131 can be accomplished corresponding to the requirements of the cleaning process. By actuation of the corresponding valve elements 132c, 131c, thus the quantity and point in time for wetting the interior of the milking cups 130 can be selected; this can be accomplished automatically as will be described more in detail below, or else manually, if required. The efficiency, for example with respect to the penetration depth of the corresponding cleaning liquid into the milking cup 120, can be appropriately controlled by appropriately selecting the pressure in the fluid sources 132a, 131a and/or the function of the valve means 132c, 131c, and/or the size and shape of the outlet 133. For example, the outlet 133 can be provided in the form of a nozzle, where by adjusting the pressure ratios in the corresponding fluid sources 132a, 131a, a wetting of the interior surfaces of the milking cup 120 can be achieved. If required, and if the mounting 110 is correspondingly designed, for example in the form of a tub with corresponding walls and a controllable drain for liquid in the tub, a suited liquid level can be also adjusted in the mounting 110 during certain operating phases, if this is desired.

Figure 1B:
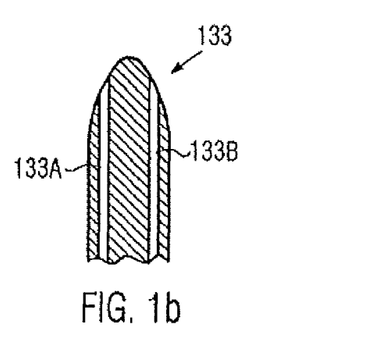
FIG. 1b shows a partial view of an outlet nozzle with several outlets according to an illustrative embodiment.

FIG. 1b shows a schematic cross-sectional view of a portion of the dispensing device 130, where one or several first outlets 133a and one or several second outlets 133b are provided which are each in communication with the corresponding fluid sources 131a, 132a via the corresponding valve means 132c, 131c. In this manner, an interaction of the corresponding cleaning fluids can be clearly reduced even inside the dispensing device 133, if required.

Figure 1C:
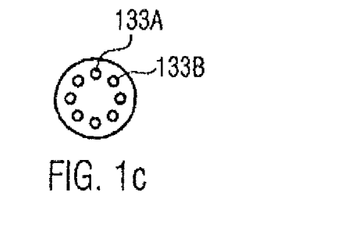
FIG. 1c shows a plan view of the nozzle of FIG. 1b.

FIG. 1c shows a schematic plan view of the dispensing device 133, where several first outlets 133a and several second outlets 133b are arranged such that wetting of the milking cup 120 as isotropic as possible is achieved for both types of fluids. That means, in the represented embodiment, a first opening 133a and a second opening 133b are provided in the circumferential direction each adjacent to one another, so that a uniform discharge of the fluids 131, 132 is achieved.

Figure 1D:
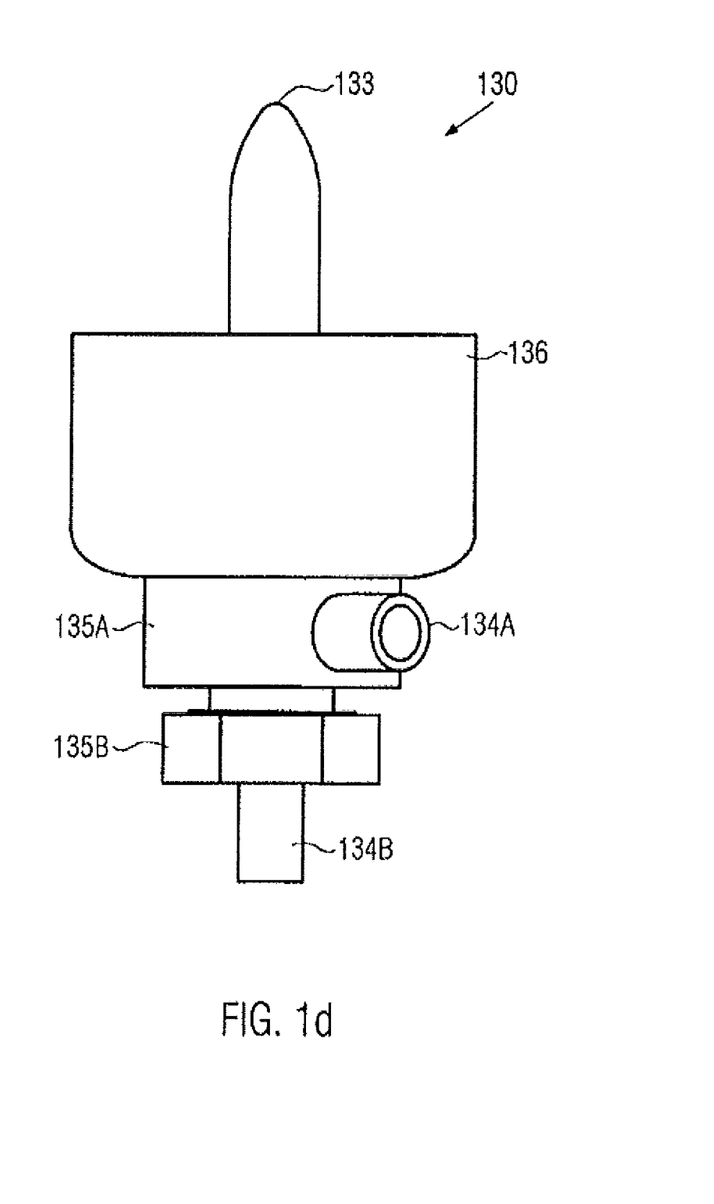
FIG. 1d shows a schematic representation of a fluid dispensing device with portions of corresponding feed lines according to an illustrative embodiment.

FIG. 1d schematically shows a side view of the dispensing device 130 according to an embodiment in which corresponding connections 134a, 134b are provided to connect the supplies 134a, 134b with the outlet 133 via corresponding threaded joints 135a, 135b in a liquid-tight manner. For example, the connection 134a can create, together with the threaded connection 135a, a liquid-tight connection to the basic body, in which the outlet 133 and the corresponding channel are designed, such that the fluid can reach the outlet 133 via appropriately positioned inlets (not shown) in the basic body. Furthermore, in the shown embodiment, a tub or chamber 136, respectively, is provided, which advantageously can also hold a certain quantity of cleaning fluid if constant wetting of corresponding areas of the milking cup 120 is desired. In the shown embodiment, the corresponding elements are mechanically connected to each other by threaded joints and corresponding seals, so that the individual parts can be disassembled and for example cleaned, if required. In other illustrative embodiments, one or several ones of the described components can be provided as a unit, so that a corresponding mechanical manufacture can be inexpensively performed.

Figure 1E:
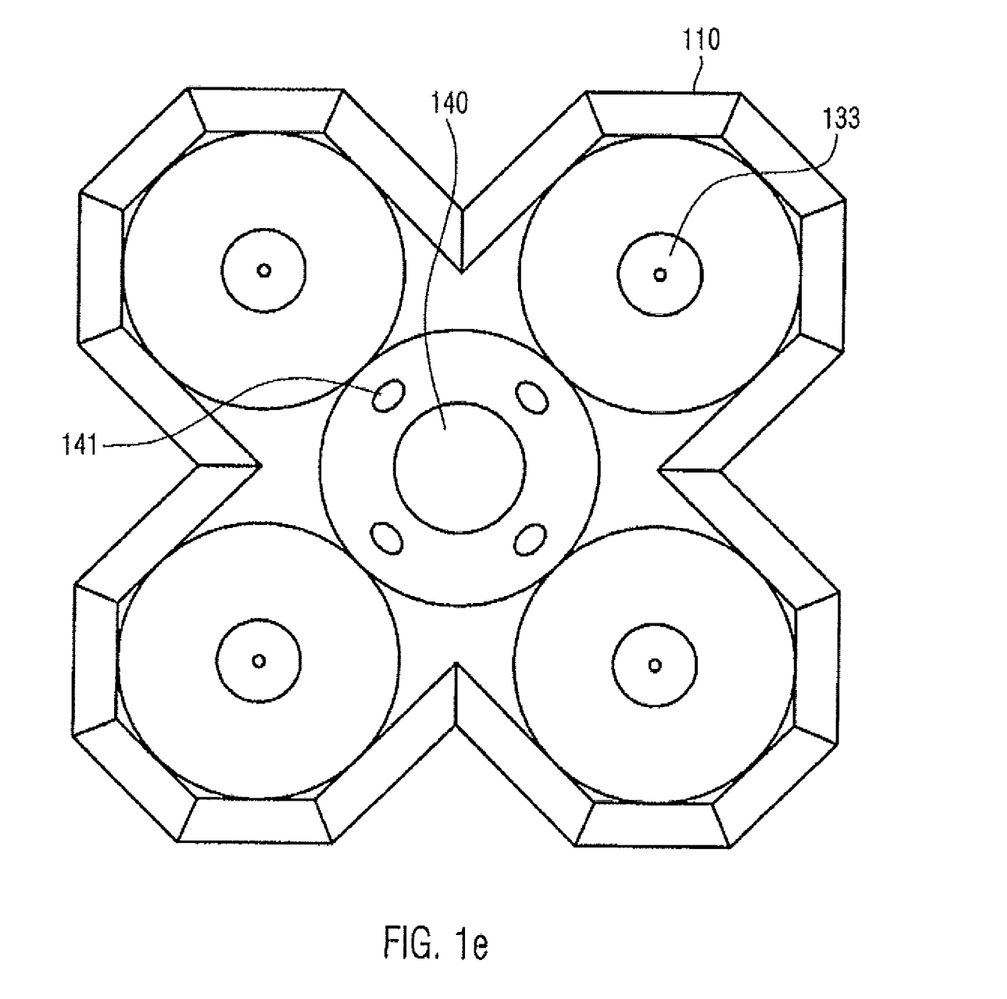
FIG. 1e schematically shows a plan view of the cleaning system of FIG. 1a according to an illustrative embodiment, wherein a spray means is provided to wet external areas of the milking cups.

FIG. 1e schematically shows a plan view of the cleaning system 100, where its dispensing devices 130 are provided in the mounting 110 to thus accommodate for example four milking cups at the same time. Furthermore, a spray means 140 is provided in the shown embodiment in which one or several outlets 141 are connected with a corresponding source of cleaning agents to thus wet in particular outer areas of the milking cups with the cleaning agent, for example water. In this manner, an efficient cleaning of the outer surfaces of the milking cups 120 can be performed, where in the shown embodiment thus the outer surfaces as well as the internal spaces of the milking cups can be cleaned and disinfected, while only one single cleaning position for each milking cup 120 is provided.

During the operation of the cleaning system 100, the milking cups 120 are approached to the mounting 110, which can be done automatically by means of a transport means, as will be illustrated more in detail below, or manually. When the milking cups 120 are being approached to the mounting 130, by the partially funnel-like design of the holding means 110, the milking cups 120 can be efficiently guided, as soon as there is a mechanical contact to the mounting 110. Thus, the milking cups 120 are essentially independently centered by the tapered shape of the mounting 110 in the represented embodiments and guided to the corresponding cleaning position. In FIG. 1a, the cleaning position of the milking cups 120 is represented such that a distance to the bottom of the mounting 110 remains, while in other embodiments, the milking cups are lowered to the bottom of the mounting 110. The dispensing device 130 can be activated already before the milking cups have reached the final cleaning position for dispensing a cleaning fluid. In other embodiments, the cleaning position that is to be understood as a position in which the dispensing device 130 applies cleaning fluids to the milking cups 120 is changed during certain operating phases to permit more efficient wetting. For example, the vertical position of the milking cups 120 can be varied to permit a varying penetration depth of the cleaning fluids. A corresponding variable vertical position can be achieved by suited means, for example a transport means as will be described later.

In some illustrative embodiments, the spray means 140 (see FIG. 1e) can be activated already during the positioning process for the milking cups 120 to thus already achieve efficient cleaning at the outer surface of the milking cups 120 across an extended longitudinal area. After or during the positioning of the milking cups 120, these are thus arranged such that at least a portion of the interior of the milking cups 120 can be wetted with different cleaning fluids by means of the dispensing means 130. For example, by manual operation of the corresponding valve means 131c, 132c, a desired quantity and a desired type of cleaning fluid can be introduced via the dispensing device 130. In other embodiments, at least after or also already during the positioning of the milking cups 120, a corresponding automated operation can be initiated, so that a previously defined cleaning sequence takes place without manual intervention. For example, European requirements demand to first rinse the milking cups 120 with water after a terminated milking process, and to subsequently disinfect the milking cups with peracetic acid, where a required application time of the disinfectant also has to be observed. Then, another rinsing process with water has to be performed to efficiently remove the residues of the disinfectant. In the process, the application time as well as the quantity of the supplied cleaning fluid can be efficiently controlled by means of the cleaning system 100, so that constant operational conditions are maintained over a plurality of cleaning processes while corresponding regulations are met. In some embodiments, a corresponding cleaning sequence comprising at least the three above-mentioned steps can be performed within a time window of 30 to 60 seconds, however, any other arbitrary chronological sequences are also possible as required. In particular, on the basis of the cleaning system 100, a corresponding dynamic adaptation can take place, for example if more intensive cleaning is required. By means of the cleaning system 100 according to the invention, the required disinfection between the individual milking processes can be achieved, for example by supplying a quantity of 0.1 to 0.5 liters of peracetic acid for four milking cups 120, where the corresponding quantity of consumed cleaning fluid can be removed after each individual cleaning process, as will be illustrated more in detail below, so that each individual cleaning process can be performed on the basis of an essentially uncontaminated freshly supplied cleaning fluid. Furthermore, if required, a corresponding disinfection of the cleaning system 100 itself can be even carried out if, for example, without the milking cups 120 being present, a corresponding cleaning liquid is held in the mounting 110 or the same is applied by means of the dispensing means 130 and/or the spray means 140, if present, when no milking cups 120 are positioned. In this manner, with a low proportion of cleaning agent, the contamination condition of the cleaning system 100 itself can be kept at a desired level.

During individual steps of the cleaning or disinfecting process, an active reduction of the quantity of the cleaning fluid(s) can be caused after a desired application time, for example by mechanical movement of the milking cups 120 or the like, as will be described below more in detail.

Figure 1F:
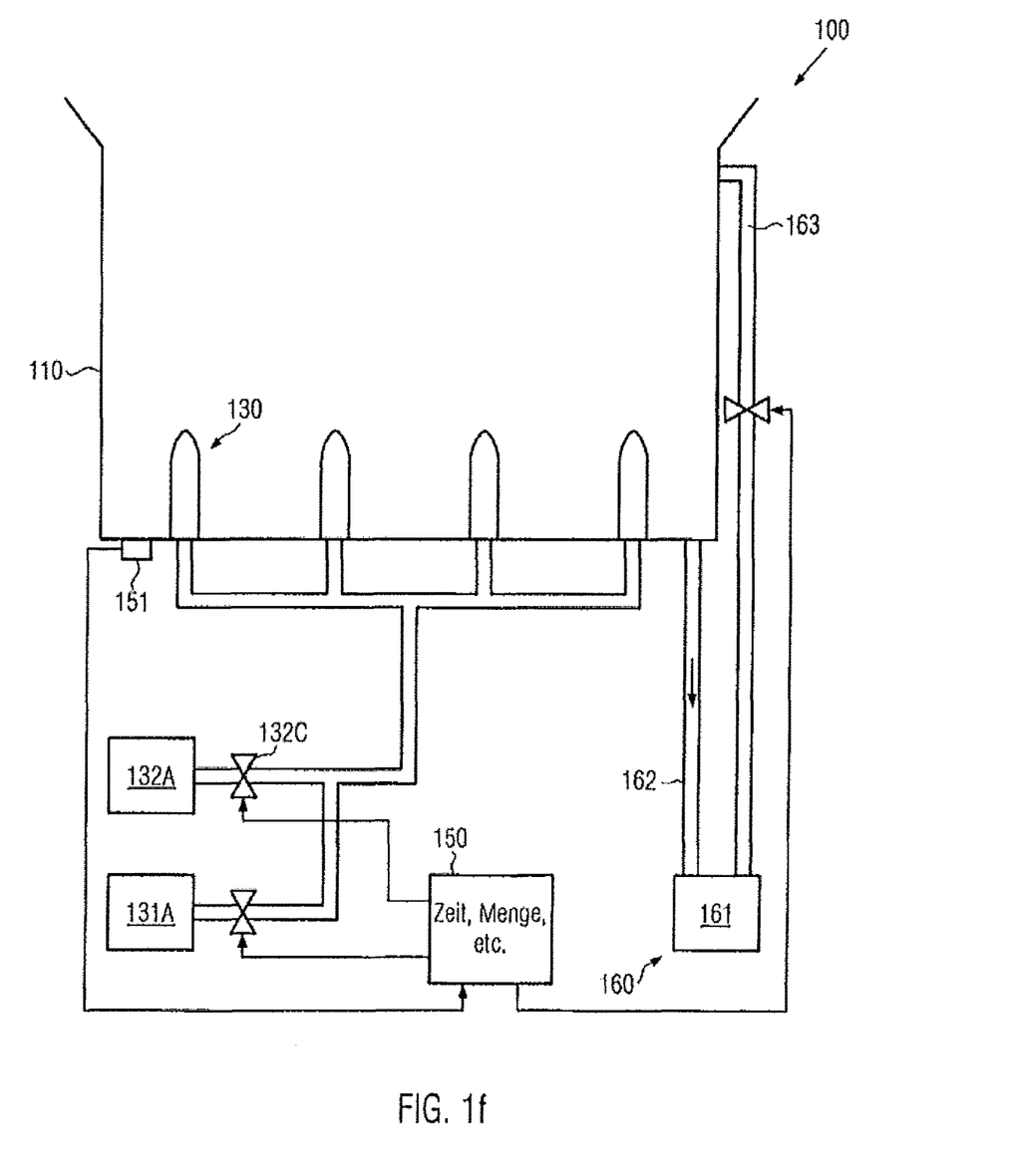
FIG. 1f schematically shows a cleaning system with a control means and a means for limiting the fluid level according to further illustrative embodiments.

FIG. 1f schematically shows the cleaning system 100 according to another illustrative embodiment in which a control means 150 is provided which is functionally connected to the valve means 132c, 131c to thus control the supply of the corresponding cleaning fluid 132, 131. In illustrative embodiments, a corresponding cleaning sequence can be implemented in the control means 150, so that in a chronologically coordinated manner the corresponding fluid sources 132a,131a are connected to the corresponding dispensing devices 130, so that a desired quantity of corresponding cleaning fluid is supplied. Furthermore, the control means 150 can appropriately adjust the application time of corresponding cleaning fluids, where a fixed application time is given in some illustrative embodiments, while in other illustrative embodiments one or several parameter values are variable to dynamically control the application time and/or also the quantity of the supplied cleaning fluids. For example, the cleaning system 100 can comprise a corresponding sensor means (not shown) which emits a signal depending on the degree of contamination of the milking cups 120 positioned in the system 100 on the basis of which then the application time and/or the quantity is adjusted. In other illustrative embodiments, a selection of different cleaning programs can be implemented which can then be called in selectively, for example by manual selection. By providing the corresponding control means 150, thus a high degree of independence of influences, for example of operating errors and the like, can be achieved.

In another illustrative embodiment, a means 160 is furthermore provided by which a desired level of a cleaning fluid can be held in the mounting 110, if the same is designed in the form of a chamber or a tub. For example, the means 160 can comprise a reservoir 161 into which the consumed cleaning fluid is introduced via a corresponding outlet line 162. In some illustrative embodiments, the outlet line 162 can be provided with a controllable valve means, so that corresponding liquids can be drained in a controlled manner. In this manner, a suited liquid level can be adjusted which can be held at a desired level by corresponding controlled draining of liquid. In other embodiments, the outlet line 162 can be represented by an opening in the mounting 110, where the opening can then be sealed so as to be fluid-tight if a milking cup 120 is present. In other embodiments, an outlet line 163 can be provided with a controllable valve means 163c to keep the level in the mounting 110 at a desired level, if required, where the valve means 163c can be actuated if in certain operating phases, for example during final cleaning, a higher liquid level is desired. In other embodiments, the limiting means 160 can comprise other suited means, for example a riser etc., so that liquid drains into the reservoir 161 if an adjusted height is exceeded. In particular, a sensor means, for example in the form of a pressure sensor, can be present to thereby obtain a signal in response to the filling height in the mounting 110 which can then be evaluated by the control means 150 to adjust the corresponding filling height by appropriately activating the valve means 163c, for example.

For example, by the means 160, a desired liquid level in the cleaning system 100 can be maintained, where then, when the milking cups 120 are being positioned, the corresponding liquid can be discharged, together with a corresponding quantity of residual liquid exiting from the milking cups 120, into the reservoir 161. Subsequently, the control means 150 can then cause a suited cleaning sequence, where the corresponding cleaning fluids can be held at a desired liquid level in the mounting 110 by the means 160, if required. The beginning of a corresponding cleaning sequence can, in an illustrative embodiment, be determined on the basis of a sensor means 151 which can supply a signal to the control means 150 that depends on the positioning of the milking cups 120 on the basis of which signal then suited control activities can be caused. For example, the sensor means 151 can be a pressure sensitive sensor means, so that the presence of a milking cup 120 can be detected. In some illustrative embodiments, the sensor means 151 can be consulted for detecting the level within the mounting 110 if no milking cup 120 is present. In other illustrative embodiments, the sensor means 151 can be designed in any other way to detect the presence of a milking cup 120. For example, the sensor means 151 can include a pressure switch which emits a corresponding signal if it comes into contact with the milking cup 120. In other embodiments, proximity switches or other means can be provided to generate a signal depending on the relative position of the milking cup 120 with respect to the mounting 110.

Figure 1G:
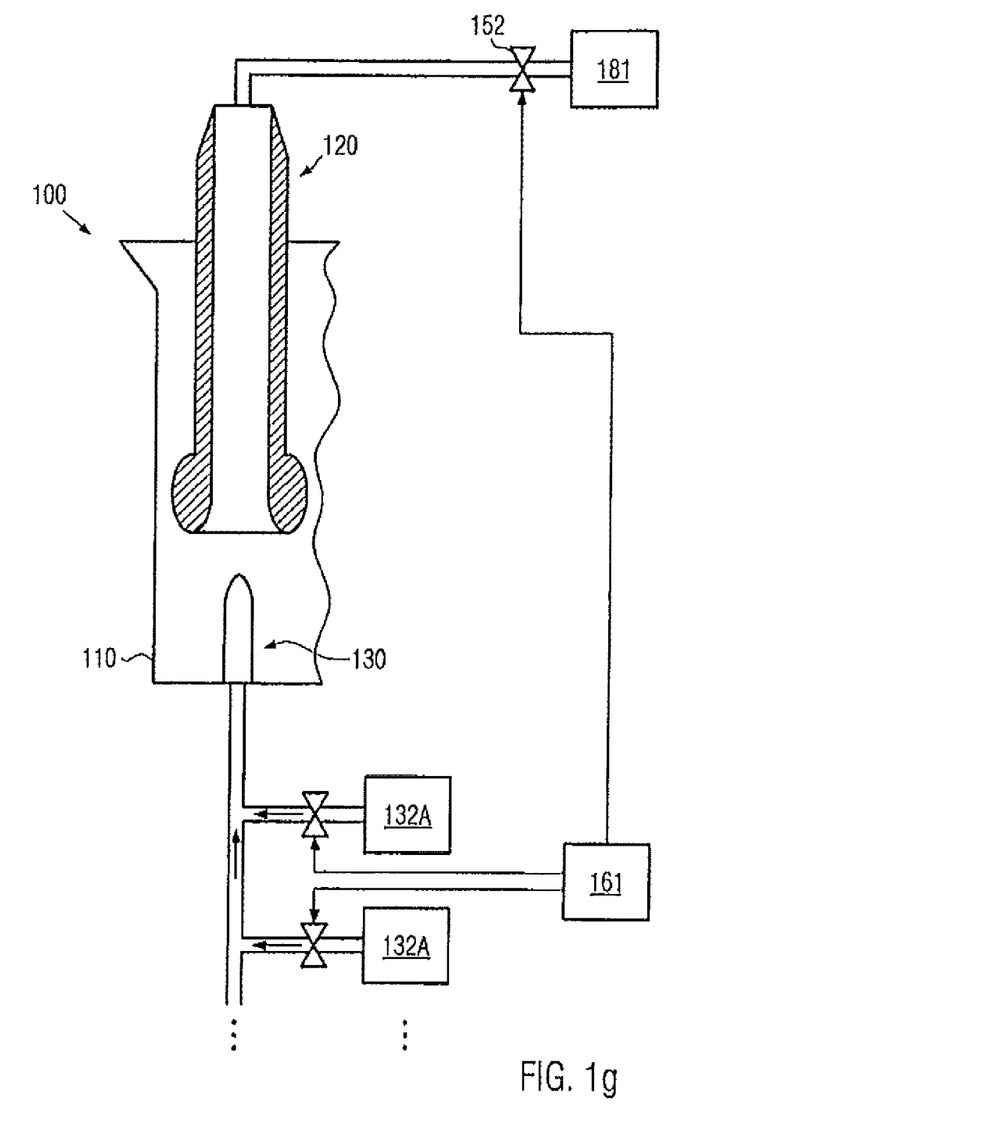
FIG. 1g schematically shows a cleaning system in which a vacuum control means for controlling the operating vacuum in the milking cup is shown.

FIG. 1g schematically shows the cleaning system 100 according to another illustrative embodiment. Here, the control means 150 is provided in the form of a vacuum control means, so that an operating vacuum created by a vacuum source 181 can be controlled in the milking cup 120 by the control means 150 by means of valve means 152. In an illustrative embodiment, by the means 152 in connection with the control means 150, the operating vacuum in the milking cup 120 can be activated and deactivated depending on the positioning of the milking cup 120. For example, when the cleaning system 100 is operated, it is advantageous to maintain the operating vacuum in the milking cup 120 at least during the approach of the milking cup 120 to the system 100, so that residual milk present in the milking cups and in the milk lines connected thereto is not distributed in an uncontrolled manner. When a suited position above the mounting 110 is achieved, the control 150 can then deactivate the vacuum so that then corresponding residual milk quantities can drain in a controlled manner and thus be disposed of. Then, the further course of the cleaning process in the system 100 can be run in a suited manner, for example by means of the control 150, to thus appropriately introduce one or several cleaning fluids into the milking cups 120 via the dispensing device 130.

Figure 2A:
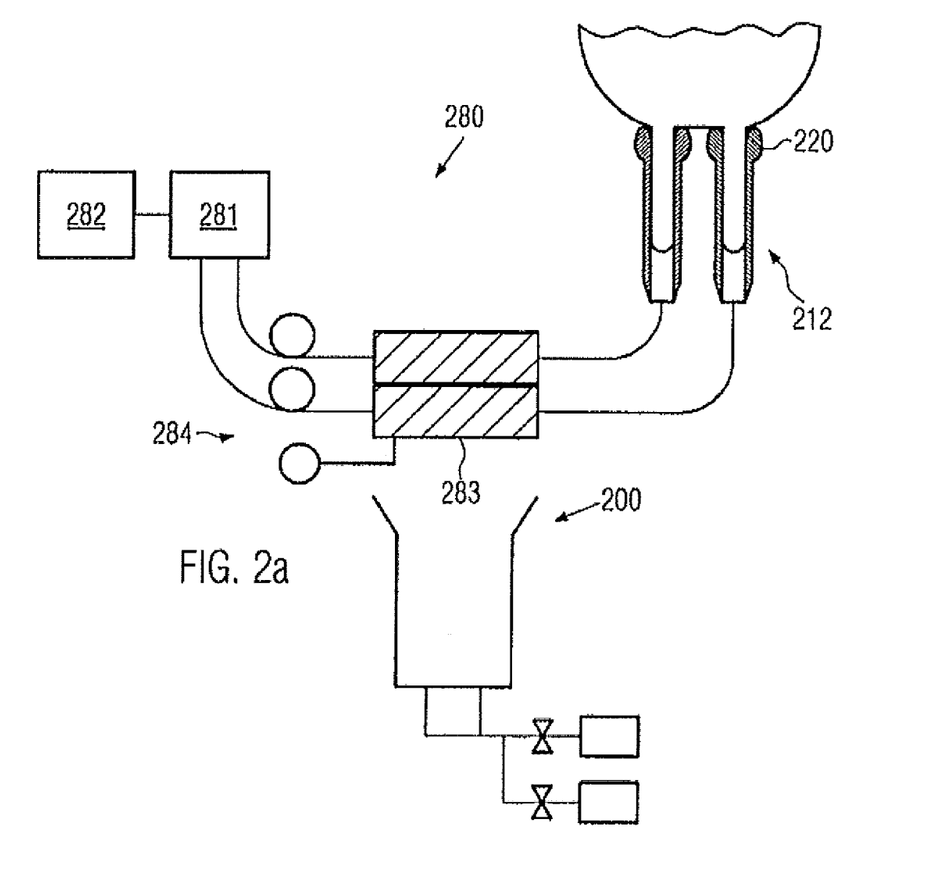
FIGS. 2a and 2b schematically show a milking plant with a cleaning system according to the invention, wherein a transport device is provided to position milking cups in the cleaning system in an automated way.

FIG. 2a schematically shows a milking plant 280 in which a vacuum source 281 is designed to provide an operating vacuum required for milking. The vacuum source 281 is further connected to a milk collecting means 282 as well as corresponding dairy utensils 221 which in turn comprise several milking cups 220. Furthermore, a transport means 284 is provided in the milking plant 280 which is designed to appropriately move the dairy utensils 211, after a milking process, to a cleaning system 200 to thus permit intermediate disinfection after individual milking processes. The cleaning system 200 is designed as described above in connection with the cleaning system 100. Thus, the cleaning system 200 is designed in particular to supply two or several different cleaning fluids by means of a dispensing device, for example the dispensing device as described above, associated to each milking cup 220. In one embodiment, in the milking plant 280 a holding means 283 is further provided and designed such that the dairy utensils 211, i.e. in particular the milking cups 220, are arranged such that they can be appropriately placed manually at an udder of an animal. For example, the holding means 283 can be designed such that, during the operating phase for milking, i.e. during a milking process and during the placing and removing of the individual milking cups 220, an essentially horizontal direction is defined by the holding means 283, and thus also an essentially horizontal position and orientation of the milking cups 220 contained therein. Furthermore, the holding means 283 can be designed to perform the process of removing the milking cups 220 in an automated or semi-automated manner, for example by temporarily interrupting the operating vacuum by action of an operator, so that the milking cups 220 fall off and can be automatically returned by the holding means 283. In other embodiments, the process of removing the milking cups 220 can also be performed manually, where the holding means 283 permits an individual removal of the milking cups 220 and a return to the mounting 283. After the end of a corresponding milking process, the transport means 284 can appropriately position the dairy utensils 221 above the cleaning system 200 to thus permit a corresponding positioning of the milking cups 220 at the cleaning positions provided for this purpose. In the embodiment which is shown in FIG. 2a, the transport means 284 can be designed such that the holding means 283 is essentially arranged vertically above the cleaning system 200 to thus permit an introduction of the milking cups 220 into the corresponding mounting 210 of the cleaning system 200.

Figure 2B:
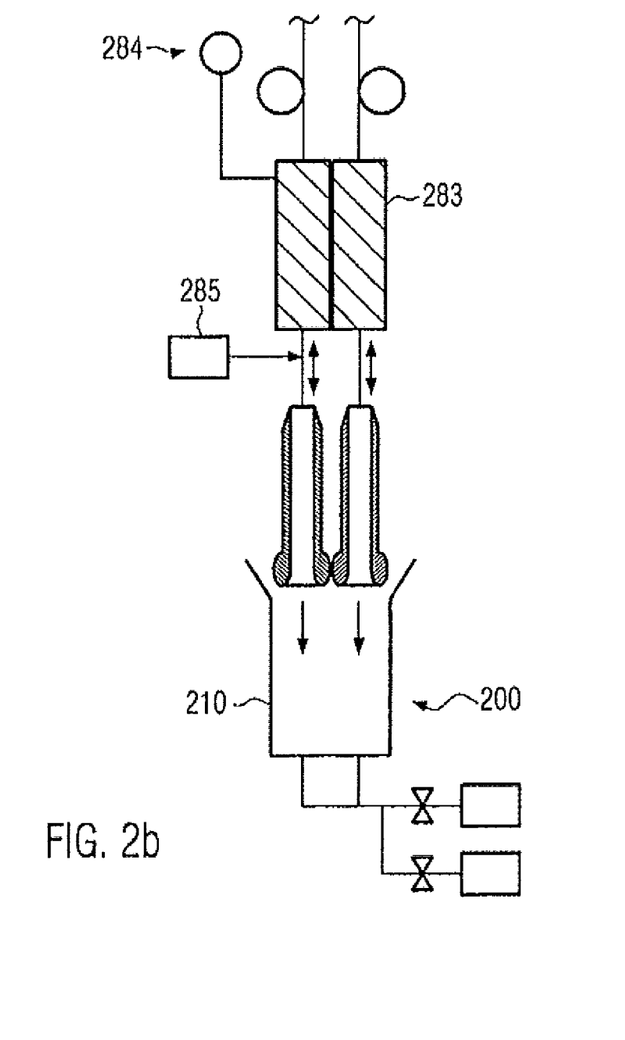

FIG. 2b schematically shows the milking plant 280, where the holding means 283 is positioned vertically. As also described above with respect to the cleaning system 100, a corresponding vacuum control means, for example in the form of the control 150 or the like, is provided in one embodiment, so that at least during the positioning phase, where residual milk can flow out in an uncontrolled manner, the operating vacuum is applied in the milking cup 220, so that essentially no soiling of the cleaning system 200 by residual milk outside the mounting 210 is caused. In the phase shown in FIG. 2b, then the operating vacuum can be deactivated again, so that the residual milk drains into the mounting 210 in a controlled manner. In other embodiments, the operating vacuum can be maintained until the milking cups 220 are positioned in the mounting 210. Furthermore, as was already described above with respect to the spray means 140 (see FIG. 1e), during the lowering of the milking cups 220, a cleaning agent can be already applied such that the corresponding outer surfaces of the milking cups 220 can be efficiently cleaned across the total length or at least an essentially part thereof. The lowering of the milking cups 220 can be accomplished by means of the transport means 284 and/or the holding means 283, for example by winding off the supply hoses for the milking cups 220 which are then positioned in the mounting 210. Subsequently, a corresponding cleaning sequence can be performed, as illustrated above. Here, the vertical position of the milking cups can be varied, if required, during the supply of one or several cleaning fluids for wetting the interior of the milking cups 220. In some embodiments, the milking cups 220 are subjected to an active "dehumidification process" after one or several process steps to thus remove cleaning fluid from the milking cups 220. For this, in one example the transport means 284 is activated to lift the milking cups 220 in the mounting 210 and to move them mechanically to thereby accelerate the dripping off of the liquid. For this, an actuator 285 that causes a suited movement of the milking cups is provided in the transport means 284. The active "dehumidification" of the milking cups 220 can, for example, be performed after each introduction of a fluid and after the desired application time, or only after predetermined steps. A corresponding mechanical movement can be performed for several seconds, or if required also for a longer period. If corresponding deflections of the milking cups 220 are too large, so that these cannot be performed within the mounting 210 in the lifted state of the milking cups, the transport means 284 can move to a suited "dry position" at which the milking cups have the required "freedom of motion". In other embodiments, in addition or as an alternative to the actuator 285, a means for generating a gas flow for dehumidifying the milking cups 220 can be provided, such that preferably an outgoing flow is built in the milking cup 220. For this, a fluid source can be connected to the interior of the milking cup via the corresponding milk lines by means of suited controllable valve means.

Upon cleaning of the milking cups 220 on the basis of at least two different cleaning fluids, the dairy utensils 221 can then be used for a further milking process. For this, the transport means 284 in the shown embodiment can bring the holding means 283 into a suited, i.e. essentially horizontal, position, so that then the milking cups 220 are ready for being placed.

As illustrated above, the cleaning system 200 can be employed in various operation modes, as already illustrated above, so that, for example, a further cleaning of the dairy utensils 221 can be initiated, if required, where, for example, cleaning liquid can also be introduced into the milking cups 220 via the connecting lines of the same, which liquid is then efficiently and in a controlled manner drained in the cleaning system 200. Moreover, in such a cleaning phase, a high liquid level can be generated within the mounting 210, so that efficient cleaning also of the outer surfaces of the milking cups 220 can be ensured. In the intermediate disinfection as well as in other cleaning phases by means of the cleaning system 200, in some embodiments, as illustrated above, the operating vacuum can also be activated and deactivated in a suited manner to thereby permit, in particular during a final cleaning, efficient rinsing of all fluid connections involved. For this, a control means, for example the control means 150, can be provided in the cleaning system 200, to appropriately activate controllable valve means for connecting the milking cups with a rinsing liquid reservoir, so that cleaning liquid can appropriately flow through all fluid connections. Thus, any type of cleaning can be efficiently performed in the system 200, where in particular the simultaneous provision of different cleaning fluids by one single dispensing device permits a high degree of flexibility in the performance of the intermediate disinfection. Thus, one can flexibly react to internal conditions, where, however, nevertheless the observance of legal provisions is efficiently possible. In particular, by the supply of different cleaning fluids at one single cleaning position for the intermediate disinfection of the milking cups, there is a possibility of achieving an improvement with respect to the efficiency of the disinfecting effect as well as in view of the consumption of cleaning agents and with respect to the throughput, where a constant quality of the process is ensured to a high degree even if the process is performed manually.

The invention claimed is:

1. A cleaning system for milking cups, comprising:
a mounting for receiving at least a portion of a milking cup, said milking cup containing an opening for introducing a teat,
a fluid dispensing device configured to introduce a first cleaning fluid from a first fluid source and a second cleaning fluid from a second fluid source into the opening,
a transport device configured to automatically position the milking cups in the mounting, and a fluid dehumidification device configured to actively reduce a proportion of at least one of the first cleaning fluid and the second cleaning fluid from the milking cup, wherein the transport device is further configured to lift the milking cups into a dry position where mechanical movement comprising deflections of the milking cups is initiated.

2. The cleaning system for milking cups according to claim 1, wherein the fluid dehumidification device comprises an actuator configured to move the milking cup after application of at least one of the first and the second cleaning fluids.

3. The cleaning system of claim 2, wherein the actuator is configured to move the milking cup so as to accelerate dripping off of at least one of the first cleaning fluid and the second cleaning fluid.

4. The cleaning system for milking cups according to claim 1, wherein the fluid dehumidification device comprises a device for applying a gas flow to the milking cup.

5. The cleaning system for milking cups according to claim 1, wherein a supply line connected to the fluid dispensing device and having a first feed line in communication with a first fluid source via a first valve and a second feed line in communication with the second fluid source via a second valve, is provided.

6. The cleaning system for milking cups according to claim 1, wherein the fluid dispensing device comprises an outlet that can be fed by the first and by the second fluid sources.

7. The cleaning system for milking cups according to claim 1, wherein the fluid dispensing device comprises a first outlet that can be fed by the first fluid source and a second outlet that can be fed by the second fluid source.

8. The cleaning system for milking cups according to claim 1, further comprising a controller configured to control the supply of the first and the second cleaning fluids to the fluid dispensing device.

9. The cleaning system for milking cups according to claim 8, wherein the controller is configured to cause the supply of the first and the second cleaning fluids in chronological sequence.

10. The cleaning system for milking cups according to claim 9, wherein the controller is configured to cause the supply of the first cleaning fluid, then the supply of the second cleaning fluid and, subsequently, again the supply of the first cleaning fluid.

11. The cleaning system for milking cups according to claim 8, wherein the controller is further configured to provide a predetermined application time for at least one of the first and the second cleaning fluids before the introduction of the other cleaning fluid is caused.

12. The cleaning system for milking cups according to claim 1, further comprising a spray device configured to wet at least an area of the outer surface of one or several milking cups with a cleaning agent.

13. The cleaning system for milking cups according to claim 1, further comprising a position sensor for providing a signal when the milking cup is being positioned in the mounting.

14. The cleaning system for milking cups according to claim 13, further comprising a controller configured to control the supply of the first and the second cleaning fluids to the fluid dispensing device, and wherein the position sensor is connected to the control means and the same controls the supply of at least one of the first and second cleaning fluid depending on the signal.

15. The cleaning system for milking cups of claim 1, wherein the dispensing device is configured to be activated before the milking cup has reached a final position for dispensing at least one of the first and second cleaning fluids.

16. The cleaning system for milking cups of claim 1, wherein the cleaning system is configured to vary a cleaning position in which the dispensing device applies at least one of the first and second cleaning fluids to the milking cup.

* * * * *